United States Patent [19]

Harman

[11] Patent Number: 5,146,494
[45] Date of Patent: Sep. 8, 1992

[54] OVERLAPPING LOOK-UP-AND-ADD ECHO CANCELLER REQUIRING A SMALLER MEMORY SIZE

[75] Inventor: Dale D. Harman, Freehold, N.J.

[73] Assignee: AT&T Bell Laboratories, Murray Hill, N.J.

[21] Appl. No.: 386,753

[22] Filed: Jul. 31, 1989

[51] Int. Cl.⁵ .............................................. H04M 3/23
[52] U.S. Cl. .................................... 379/411; 379/406; 379/410; 370/32.1; 364/724.19
[58] Field of Search ........................ 379/406, 410, 411; 370/32.1, 32; 364/724.01, 724.16, 724.19

[56] References Cited

U.S. PATENT DOCUMENTS

| | | | |
|---|---|---|---|
| 3,914,588 | 10/1975 | Nussbaumer | 364/724.16 |
| 4,736,414 | 4/1988 | Montagna et al. | 364/724.19 |
| 4,792,915 | 12/1988 | Adams et al. | 364/724.19 |
| 4,829,566 | 5/1989 | Lassaux et al. | 379/410 |
| 4,843,581 | 6/1989 | Cupo et al. | 364/724.16 |
| 5,007,044 | 4/1991 | Miyoshi et al. | 379/411 |

FOREIGN PATENT DOCUMENTS

2095067  9/1982  United Kingdom ........... 364/724.16

*Primary Examiner*—James L. Dwyer
*Assistant Examiner*—Jhancy Augustus
*Attorney, Agent, or Firm*—David R. Padnes

[57] ABSTRACT

An echo canceller which incorporates an overlapping look-up-and-add structure is suitable for cancelling both the linear and nonlinear components of an echo. In the well-known overlapping look-up-and-add structure, the cancellation provided is the sum of a plurality of memory outputs wherein each memory is addressed by an associated transmitted symbol in a sequence of symbols along with one symbol immediately preceding and/or one symbol immediately succeeding each associated symbol. In accordance with the present invention, this structure is modified so that each memory is addressed by the plurality of bits representative of an associated symbol in the sequence of symbols along with less than all of the bits representative of one or more symbols adjacent to the associated symbol in the sequence. This modification, which may be incorporated in a fixed or adaptive echo canceller, substantially reduces the required memory size and, in the case of an adaptive canceller, provides a corresponding decrease in the convergence time. In the preferred embodiment, each memory is addressed by its associated symbol and only the sign bit of immediately preceding and/or immediately succeeding symbols.

11 Claims, 2 Drawing Sheets

OVERLAPPING LOOK-UP-AND-ADD ECHO CANCELLER REQUIRING A SMALLER MEMORY SIZE

TECHNICAL FIELD

The present invention relates to echo cancellers and, more particularly, to an overlapping look-up-and-add echo canceller which, using less memory than that required in the prior art, provides cancellation of the linear and nonlinear distortion components of an echo.

BACKGROUND OF THE INVENTION

An echo in a 2-wire communications system may be defined as that part of a transmitted signal at a particular location which is reflected back and received along with the incoming signal at that particular location. This form of distortion is an inherent problem in 2-wire duplex communications systems which principally aries from an unavoidable impedance mismatch at the hybrid transformer which interfaces the 2-wire communications path. For purposes of this application, the term "wire" is meant to encompass any conductive signal path in which an undesirable echo is present.

An echo has both a linear and a nonlinear component. In data system applications, the amount of echo cancellation required varies directly with the data speed and a myriad of other factors. Echo cancellers are devices which have long been used to cancel or substantially obliterate an error-producing echo. Many of such devices are effective for only eliminating the linear component of the echo while others are useful for cancelling both the linear and nonlinear components of an echo. In certain data applications, e.g., voiceband modems having data rates less than 9600 bits/sec, cancellation of the linear component alone provides a sufficient signal-to-residual echo ratio to meet performance objectives. However, as the data speed is increased, cancellation of the nonlinear component of the echo is necessary if the required signal-to-residual echo ratio is to be attained.

One type of echo canceller suitable for cancelling both the linear and nonlinear components of an echo is referred to as an overlapping look-up-and-add canceller. See, for example, U.S. Pat. No. 4,792,915 to Adams et al., issued Dec. 20, 1988, which is incorporated herein by reference. In an overlapping look-up-and-add structure, the cancellation provided is a function of a plurality of successively transmitted data symbols. More specifically, a different symbol in the plurality of transmitted symbols and one or both of the symbols immediately adjacent to each different symbol are used as an address to an associated memory. The echo cancellation provided by such a structure is the sum of the associated memory outputs and may be fixed for a given sequence of symbols or may be adaptive. In an adaptive overlapping look-up-and-add structure, the values stored in memory for a given sequence of symbols are updated over time in order to optimize the echo cancellation in a given application. Tis updating of the stored values is quantified by a parameter known as the convergence time. Convergence time, which is directly proportional to the size of the memory, is defined as the time required for the stored values in memory to migrate to values which optimize the echo cancellation in the given application.

While prior art fixed and adaptive overlapping look-up-and-add cancelers theoretically provide satisfactory echo cancellation, the required memory size often renders implementation in a given system impractical. Another shortcoming of these echo cancellers is that in an adaptive overlapping look-up-and-add canceller, the convergence time also does not meet the desired objectives.

In light of the foregoing, it would be extremely desirable if an echo canceller cold be devised which compensates for both the linear and nonlinear components using a structure which is readily implementable using significantly less memory than that previously required and possesses a desirable convergence time.

SUMMARY OF THE INVENTION

In accordance with the present invention, the prior art overlapping look-up-and-add structure is modified so that each associated memory is addressed by a plurality of bits representative of an associated symbol in a sequence of symbols and less than all of the bits representative of the symbols adjacent to each associated symbol in the sequence. In one embodiment of the present invention, each memory is addressed by a different symbol and only the sign bit of the symbols immediately preceding and succeeding the associated symbol. This use of less than all of the bits of the immediately preceding and succeeding symbols does not significantly degrade performance of the canceller and substantially reduces the required memory size. For example, in a typical voiceband modem application, the prior art look-up-and-add canceller requires a memory with 100,000K memory locations while the same application using the present invention requires a memory with 100K memory locations. Advantageously, this significant reduction in the required memory provides a corresponding decrease in the convergence time for an adaptive echo canceller incorporating the present invention.

DETAILED DESCRIPTION

Figure 1:
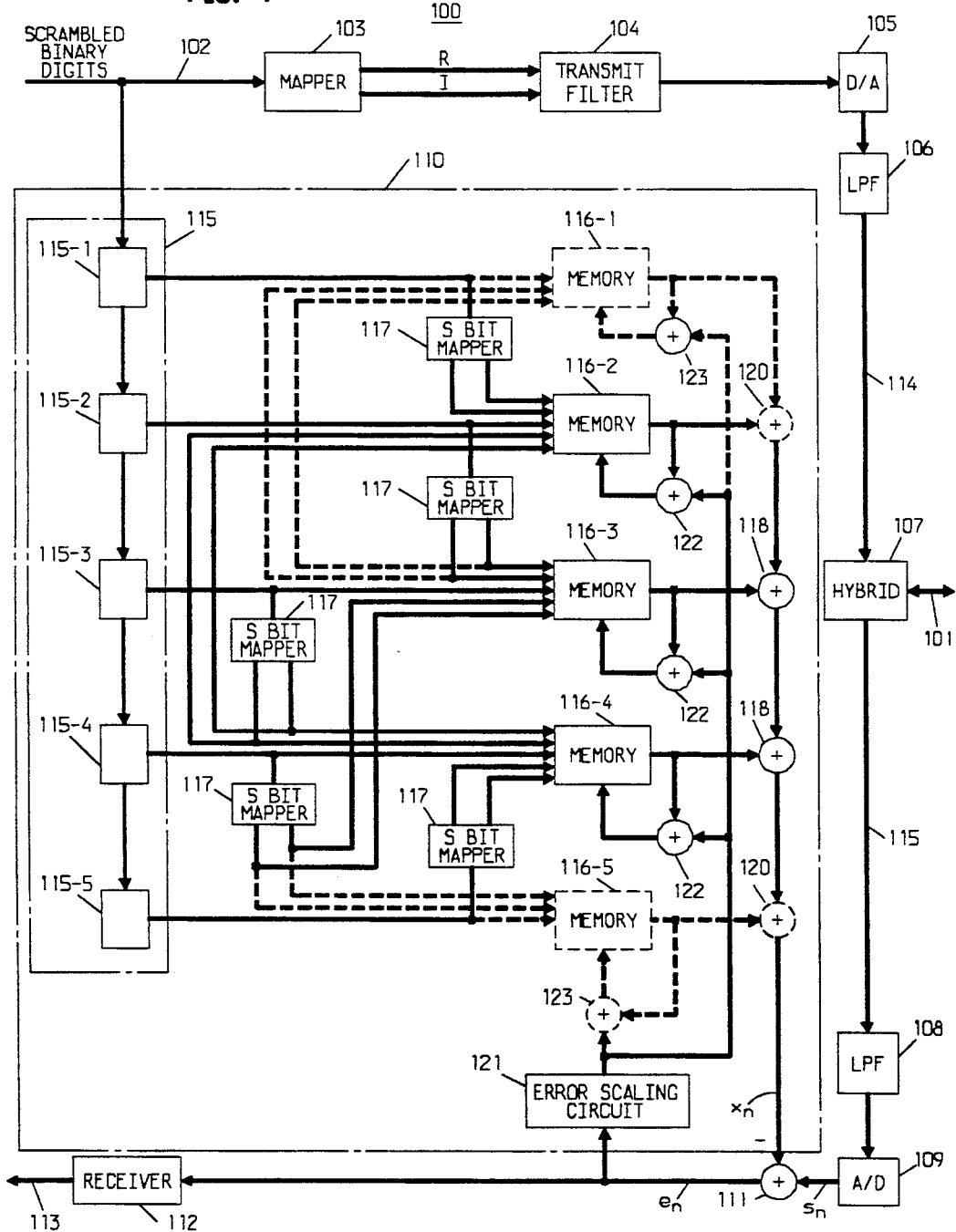
FIG. 1 is a block schematic diagram of a transceiver, i.e., a transmitter/receiver, which incorporates two embodiments of an echo canceller in accordance with the present invention.

FIG. 1 shows an illustrative transceiver (transmitter/receiver) 100 which transits quadrature amplitude modulated (QAM) signals on lead 101 and receivers such signals, transmitted by another transceiver at a remote location (both not shown), from this lead. At the outset, it should, of course, be understood that while the illustrative transceiver incorporates QAM modulation, the present invention is not restricted to this modulation format and is applicable to any modulation scheme.

Within the transmitting portion of transceiver 100, scrambled and possibly digitally encoded (e.g., trellis coded) binary digits on bus 102, supplied by well-known apparatus (not shown), are coupled to mapper 103. Mapper 103 successively maps a plurality of M binary digits into a digital representation of the real (R) and imaginary (I) symbol components in the QAM modulation format. The number of bits per symbol, M, is variable and is a function of the data speed, symbol rate and coding utilized. In 16 QAM, for example, M equals 4 binary digits while in 64 QAM, M equals 6 binary digits. In any event, regardless of the particular QAM format, the digital representations provided by mapper 103 are coupled through transit filter 104 which provides well-known spectral shaping, such as Nyquist or square-root Nyquist shaping, and thence to digital-to-analog (D/A) converter 105 wherein the digital representations are converted into the analog QAM signal. This analog QAM signal is then conducted through smoothing low-pass filter (LPF) 106 and hybrid transform 107 to lead 101.

In the receiving portion of transceiver 100, QAM signals from lead 101 are coupled through hybrid transformer 107, antialiasing low-pass filter (LPF) 108 and analog-to-digital (A/D0 converter 109. Converter 109 provides digital representations of the QAM signal from which the output of echo canceller 110 is subtracted via subtracter 111 and the resulting difference is supplied to receiver 112. Within receiver 112, the originally transmitted scrambled binary digits form the other locations are recovered and outputted on lead 113.

Echo canceller 110 substantially eliminates the inherent portion of the transmitted QAM signal on lead 114 which appears on lead 115 as an echo along with the incoming QAM signal from the other transceiver. This echo is often broken down into a "near" echo and a "far" echo. Referring to FIG. 1, the near echo is one which is coupled through hybrid transferer 107 while the far echo is one which is caused by other impedance mismatches at locations remote from transceiver 100. It should be appreciated that echo canceller 110 is suitable for cancelling either near or far echoes. With the latter type of echo, additional bulk delay (not shown) is typically inserted between bus 102 and delay line 115 to compensate for the delay in the additional path travelled by the far echo relative to the near echo. The value of tis additional bulk delay can be determined in well-known fashion.

Canceller 110 incorporates a modified overlapping look-up-and-add structure which reduces both the linear and nonlinear echo components. In the prior art overlaying look-up-and-add canceller, each memory is addressed by a set of M binary digits representing an associated symbol in a succession of consecutively transmitted symbols along with the M binary digits representing the symbols immediately preceding and succeeding the associated symbol. The echo canceller output is then the sum of outputs of each addressed memory. In accordance with the broadest aspect of the present invention, this arrangement is modified so that while each memory is again addressed by M binary digits representing an associated symbol in a succession of consecutively transmitted symbols, in contrast to the prior art's use of M binary digits for each of the two symbols adjacent to the associated symbol, each memory address now includes less than all of the M binary digits representing at least one symbol adjacent to the associated symbol.

Referring to FIG. 1, in one preferred embodiment of the present invention, memories 116-2 through 116-4 are respectively addressed by the M bits in associated delay line elements 115-2 through 115-4 along with the sign bits, i.e., the bits in a symbol representing the algebraic sign, of the real and imaginary symbol components stored in the delay line elements immediately adjacent to the associated delay line element. Accordingly, memory 116-2 is addressed by the M bits in delay line element 115-2 along with the sign bits of the symbols stored in delay line elements 115-1 and 115-3, memory 116-3 is addressed by the M bits in delay line element 115-3 along with the sign bits of the symbols stored in delay line elements 115-2 and 115-4, and memory 116-4 is addressed by the M bits in delay line element 115-4 along with the sign bits of the submoles sorted in delay line elements 115-3 and 115-5. It should be noted that there are two sign bits for each QAM symbol, one for the R and one for the I component, and these sign bits are extracted from each symbol in the adjacent delay line element via one of S bit mappers 117. The output of this embodiment of the echo canceller is provided by summing the outputs of memories 116-2 through 116-4 via adders 118.

In another preferred embodiment of the present invention, the embodiment shown in FIG. 1 can be modified by the addition of memories 116-1 and 116-5 and address 120 which are both shown in dotted lines. This embodiment is identical to that previously described except that the M bits stored in delay line element 115-1 are used to address memory 116-1 along with the sign bits of the symbol stored in delay line element 115-2 and memory 116-5 is addressed by the M bits stored in delay line element 115-5 along with the sign bits of the symbol stored in delay line element 115-4. Note that for memory 116-1, the associated symbol is that sorted in delay line element 115-1 and that there is no stored symbol in the delay line immediately preceding the associated symbol. Similarly, memory 116-5 is addressed by the M bits of the associated symbol stored in delay line element 115-5 along with the sign bits of the symbol stored in delay line element 115-4. Here the symbol which immediately succeeding that stored in delay line element 115-5 is not available as it has already passed through the delay line. In this second arrangement, wherein the number of memories is two less than the number of delay line elements as opposed to the first, the number of memories is equal to the number of delay line elements or, in other words, the number of memories is equal to the memory span of the echo canceller.

In either embodiment of the present invention, the echo cancellation may be fixed or may be adaptive. In the latter case, the values stored in each memory are updated with time based on the signal appearing at the output of subtractor 111 using updating circuit 121 and adders 122 and 123. Adders 123 are required only when memories 116-1 and 116-5 are used. One possible implementation of this circuit, using a least-mean-square (LMS) algorithm, is now briefly discussed.

Let $s_n$, $x_n$, and $e = s_n - x_n$ denote the outputs of A/D 109, echo canceller 110 and subtractor 111, respectively, at time instant n. An LMS algorithm minimizes the mean squared error $<e_n^2>$, where $<e_n^2>$ represents the expected value of squared error ($e_n^2$). In FIG. 1 the quantity $\alpha e_n$ is computed in the error scaling circuit 121 and is then added to the output of each individual memory using adders 122 and 123. Each sum is then stored back in the memory at the addressed location. The quantity $\alpha$ in the updating algorithm is called the step size of the adjustment algorithm, and it typically assumes a large value during initial echo canceller training and a smaller value during steady state operation. Each of these updated values is read out of memory in response to an associated memory address. Since this address is dependent on a specific sequence of scrambled binary digits, any updated value may be red out soon after updating or may not be read out of memory for some time.

Figure 2:
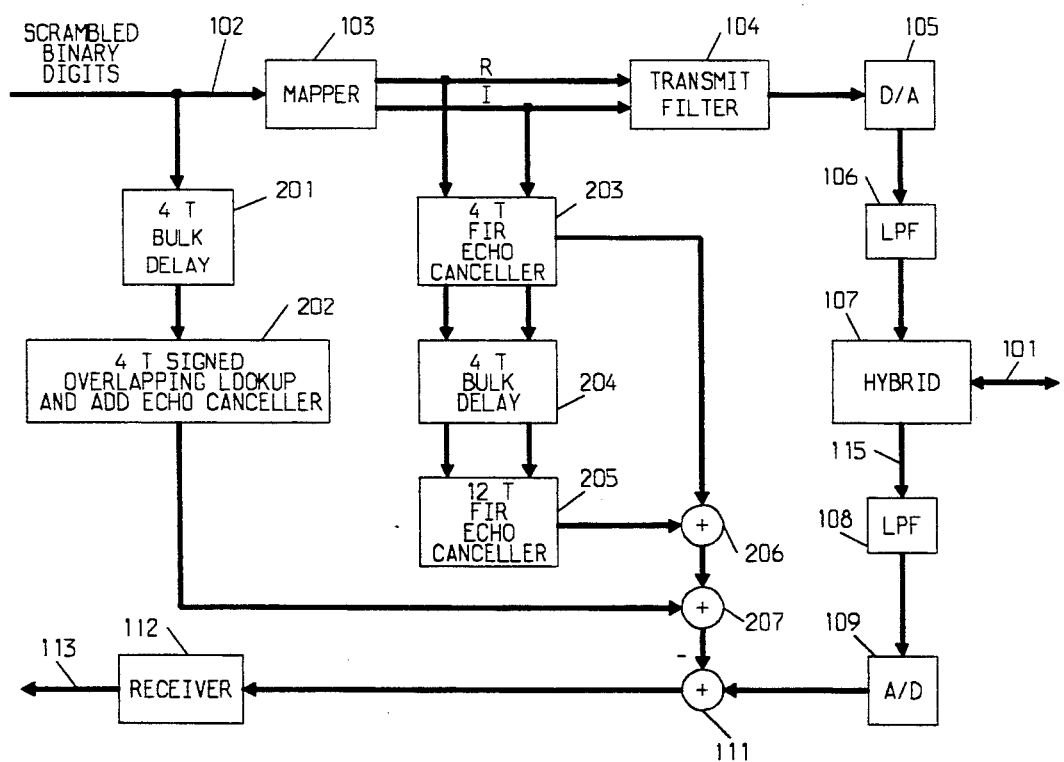
FIG. 2 is a block schematic diagram of a transceiver which incorporates the echo canceller embodiments of FIG. 1 along with prior art finite impulse response echo cancellers.

Refer now to FIG. 2 which shows how the present invention can be combined with prior art finite impulse response (FIR) echo cancellers to further reduce the required memory size. As shown, an overlapping look-up-and-add echo canceller 202, in accordance with the present invention, having an illustrative memory span of 4 symbol periods (4T) is serially connected to a 4 symbol period delay line 201 which, in turn, is connected to lead 102. In addition, FIR echo cancellers 203 and 205 respectively having illustrative memory spans of 4 and 12 symbol periods (4T and 12T) are serially disposed with a 4 symbol period (4T) delay line 204. The outputs of FIR echo cancellers are combined via adder 206 and the output of this adder is then added to the output of the look-up-and-add echo canceller using adder 207.

In the particular example shown in FIG. 2, it is assumed that there is no delay through mapper 103 and the peak of the echo channel impulse response is 6 symbols periods after the leading edge. Note that 4T FIR echo canceller 203 is operative on the leading edge or initial part of the impulse response, 4T overlapping look-up-and-add canceller 202 is operative on a 4 symbol period interval centered about the peak of the impulse response by virtue of 4T bulk delay lines 201 and 204, and 12T FIR echo canceller 205 is operative upon 12 symbol periods of the trailing edge of the impulse response. Advantageously, this arrangement utilizes the present invention to cover the center of the echo channel's impulse response where the nonlinear echo component is the greatest and then uses the simpler FIR structure to cover the tails of the transmitted impulse response. This structure cancels all of the linear portion of the echo and a substantial part of the nonlinear portion of the echo.

It should, of course, be understood that while the present invention has been described in terms of several illustrative embodiments, other arrangements will be apparent to those of ordinary skill in the art. For example, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. In addition, while the present invention has been described in reference to the use of 3 or 5 memories, the present invention can be designed for use with any plurality of memories. Moreover, the joint use of additional memories 116-1 and 116-5 need not be joint and only one of these additional memories need be used. Finally, while the present invention has been described in reference to a particular system application, the inventive concept can be used in virtually any application where echo cancellation is desired.

I claim:

1. An echo canceller for use in a transceiver which transmits and receives data symbols, each of said data symbols being representative of a plurality of bits, said echo canceller comprising a plurality of memories for storing appropriate echo cancellation values;

means for addressing each of said memories with the plurality of bits representative of a different associated data symbol in a sequence of transmitted data symbols and less than all of the bits representative of at least one of the data symbols adjacent to said associated data symbol in said sequence and for reading said echo cancellation values in response to the memories being addressed; and means for combining all of said echo cancellation values read out of said memories.

2. The echo canceller of claim 1 wherein said at least one of the data symbols is that data symbol which immediately precedes said associated data symbol in said sequence.

3. The echo canceller of claim 1 wherein said at least one of the data symbols is that data symbol which immediately succeeds said associated data symbol in said sequence.

4. The echo canceller of claim 1 wherein said addressing means utilizes two data symbols adjacent to said associated data symbol in said sequence.

5. The echo canceller of claim 4 wherein the two data symbols are those which immediately precede and succeed said associated data symbol in said sequence.

6. The echo canceller of claim 1 wherein each of said plurality of bits includes at least one sign bit and said addressing means utilizes only the sign bit of said at least one data symbol adjacent to said associated data symbol in said sequence.

7. The echo canceller of claim 6 wherein said at least one data symbol is that data symbol which immediately precedes said associated data symbol in said sequence.

8. The echo canceller of claim 6 wherein said at least one data symbol is that data symbol which immediately succeeds said associated data symbol in said sequence.

9. The echo canceller of claim 6 wherein each of said plurality of bits includes at least one sign bit and said addressing means utilizes only the sign bit of two data symbols which immediately precede and immediately succeed said associated data symbol in said sequence.

10. The echo canceller of claim 1 further including means responsive to the combined echo cancellation values read out of said memories for revising the echo cancellation values stored in said plurality of memories.

11. A method of cancelling echoes in a transceiver which transmits and receives data symbols, each of said data symbols being representative of a plurality of bits, said method comprising the steps of storing appropriate echo cancellation values in a plurality of memories;

addressing each of said memories with said plurality of bits representative of a different associated data symbol in a sequence of transmitted data symbols and less than all of the bits representative of at least one of the data symbols adjacent to said associated data symbol in said sequence;

reading out the echo cancellation values in response to said addressing step; and combining all of said echo cancellation values read out of said memories.

* * * * *